United States Patent Office 2,824,076
Patented Feb. 18, 1958

2,824,076

PREPARATION OF ODOR-FREE CELLULAR POLY-VINYLCHLORIDE WITH DINITROSOPENTA-METHYLENETETRAMINE

Mack F. Fuller, Woodbury, N. J., assignor to E. I. du Pont de Nemours and Company, Wilmington, Del., a corporation of Delaware No Drawing. Application December 21, 1953
Serial No. 399,577

4 Claims. (Cl. 260—2.5)

This invention relates to a novel process and product. More specifically it is concerned with a novel composition of matter useful as a blowing agent and with a process for the production of open cell polyvinyl chloride sponge and the product produced by this process.

It is an object of the present invention to provide a novel composition of matter useful as a blowing agent in the production of open cell polyvinyl chloride sponge.

Another object is to provide odor free open cell polyvinyl chloride sponge.

A further object is to provide a process for the production of odor free open cell polyvinyl chloride sponge.

These and other objects will become apparent in the course of the following specification and claims.

In accordance with the present invention, a blowing agent composition useful in the production of open cell, odor free polyvinyl chloride sponge is provided comprising dinitrosopentamethylenetetramine, certain weakly ionized acids, and a slightly alkaline organic compound of a class to be defined hereinafter. The material dinitrosopentamethylenetetramine will be referred to hereinafter as "DNPT."

The following examples are cited to illustrate the invention. They are not intended to limit in any manner. All parts recited are by weight.

*Example 1*

A blowing agent composition of the following ingredients:

| | Parts |
|---|---|
| DNPT | 4 |
| Finely pulverized urea | 5 |
| Boric acid | 4 | is employed to form a plastisol by mixing with:

| | Parts |
|---|---|
| Dispersion-grade polyvinyl chloride | 100 |
| Di-2-ethylhexyl phthalate | 112.5 |
| Chlorinated paraffin (40% chlorine) | 37.5 |
| Dibasic lead phosphite | 5 |

The plastisol as prepared above is poured into a 2 in. x 3½ in. (I. D.) aluminum pan to a depth of ¼ in. It is then heated for ½ hour in a convection type oven, the air temperature of which is 153° C. A soft and fragile, gelled porous mass is formed. Upon cooling to room temperature, the expanded composition stiffens into a strong, white, resilient sponge. It is free of fish-like odor usually associated with DNPT blown polyvinyl chloride. The open cells are fine and of uniform size. The final structure has a thickness of 15/16 in. and a density of 21.5 lb./cu. ft.

*Example 2*

A plastisol is prepared by mixing together the following:

| | Parts |
|---|---|
| Dispersion-grade polyvinyl chloride | 100 |
| Di-2-ethylhexyl phthalate | 112.5 |
| Chlorinated paraffin (40% chlorine) | 37.5 |
| Boric acid | 6 |
| Finely pulverized urea | 7.5 |
| DNPT | 6 |

An aluminum pan 4 in. x 8 in. (I. D.) is filled to a depth of ¼ in. with the above plastisol. The mass is heated in a convection type oven, the air temperature of which is 153° C. for 45 minutes. A soft foamy product is formed. Upon cooling it has a thickness of 1 1/16 in. and a density of 15.2 lb./cu. ft. It has a slightly creamish color due to the length of the heating period. No fish-like odor is observed.

*Example 3*

A plastisol is prepared by mixing together the following:

| | Parts |
|---|---|
| Dispersion-grade polyvinyl chloride | 100 |
| Di-2-ethylhexyl phthalate | 112.5 |
| Chlorinated paraffin (40% chlorine) | 37.5 |
| Citric acid | 2 |
| Finely pulverized urea | 7.5 |
| DNPT | 6 |

The plastisol so prepared is processed in the manner described in Example 1. The expanded composition has a thickness three times that of the plastisol and a density of approximately 23 lb./cu. ft. It is similar in odor and appearance to the product of Example 1.

The temperature of the plastisol during the foaming operation is maintained between from about 60° C. to about 130° C. A somewhat higher temperature is beneficial to accomplish the gelation and fluxing of the foamed mass. The foaming must be permitted to occur prior to gelation. It will be apparent that a wide variation of temperature conditions is possible to obtain these results depending upon the heat transfer characteristics of the mold and the efficiency of the oven. Operating with aluminum molds and a convection-type oven, first blowing and then gelation, and finally fluxing occur satisfactorily within the oven temperature range of from about 145° to about 170° C. At oven temperatures below 120° C. the period required for blowing becomes unduly long. At oven temperatures substantially above 170° C. discoloration occurs due to charring. The heating period necessary will depend on the nature of the DNPT activator, the amount of DNPT present relative to polyvinyl chloride and the temperature employed. Under the conditions outlined herein this period will vary from about 20 to about 60 minutes.

Where heat transfer is very efficient it is often desirable to employ a two-stage heat treatment to avoid gelation prior to foaming. This is particularly true in the blowing in relatively thin shallow molds. Such a two-stage operation is exemplified below.

*Example 4*

A plastisol is prepared and poured into an aluminum pan as described in Example 1. It is heated for 10 minutes in a forced circulation oven, the air temperature of which is 130° C. The oven temperature is raised to 150° C. and heating is continued for an additional 30 minutes. During this period the product expands and has the appearance of a thick boiling molten mass. On cooling the product is ¾ in. thick. It is similar to the product of Example 1 in odor and appearance.

It will be apparent from a consideration of the examples cited above that in the process of the present invention the usual proportions of conventional plasticizer such as di-2-ethylhexyl phthalate, chlorinated paraffin and the like are included to produce the plastisol from which the sponge is produced. From about 120 to about 150 parts of plasticizer per 100 parts of polyvinyl chloride is preferred. Known stabilizers, such as dibasic lead phosphite, antioxidants and the like may also be included.

The presence of a minor proportion of a weakly ionized acid from the group consisting of boric and citric is essential to the success of the process. Boric acid is preferred. Citric acid may be employed but has not been found as satisfactory as boric acid with respect to the color and cell structure of the sponge produced. No other acids effective in this capacity are known. The blowing agent composition should contain at least about 0.5 part of boric acid per part of DNPT. As much as 2.0 parts may be present without deleterious effects. It is preferred that there be from about 1.0 to about 1.5 parts of boric acid per part of DNPT. Optimum concentrations of citric acid are about one-half those of boric acid.

The slightly alkaline organic material may be any member of the group consisting of a urea and a lower alkanol amine. Urea, biuret and tris(hydroxymethyl) amino methane have been found particularly useful. Urea is preferred since the product formed where it is used is substantially odor free and of low density. A reduction of fish-odor is observed with as little as 1.0 part of alkaline organic material per part of DNPT. The use of about 2.0 parts per part of DNPT is recommended. Where urea and boric acid are employed as slightly alkaline organic material and weakly ionized acid respectively, it is preferred to employ at least about 0.8 part of urea per part of boric acid.

The use of the blowing agent composition in the blowing of open cell polyvinyl chloride with DNPT in accordance with the present invention produces a product without the usual fishy odor associated with the similar material produced by the prior art processes. No fish-odor reduction is observed using the acid base combination described herein, in pressure blowing. In open cell blowing of the present invention, the urea and acid complement each other and produce a white sponge of low density and uniform cell structure. Omission of the acid in the process results in very little expansion of the plastisol. Omission of the weakly basic component results in a sponge of fishy odor with poorer expansion and cell structure than is obtained when both the acid and basic components are employed.

The odor of mixing the ingredients prior to blowing is not critical. They may be added to the mixer simultaneously or in any order desired. It is sometimes convenient to add the active blowing components as a dry mix, such as finely divided boric acid, urea and DNPT. Agitation prior to heating is necessary to provide homogeneity. Usually about 5 minutes with moderate mixing is adequate. During the mixing, the temperature of the mass is maintained below about 40° C. The mixed mass may be foamed immediately or stored for foaming at a later date. Due to the tendency of the plastisol to gel on extended storage at room temperature, it is preferred to foam within 48 hours of mixing.

The use of from about 4 to about 8 parts of DNPT per 100 parts of polyvinyl chloride is preferred. Higher concentrations of blowing agent causes undue tendering of the sponge without additional expansion.

Many other modifications within the purview of the above described invention will be apparent to those skilled in the art from a reading hereof without a departure from the inventive concept.

What is claimed is:

1. A process of preparing a substantially colorless, odor free, open cell polyvinylchloride sponge which comprises expanding polyvinylchloride by heating in an environment which is maintained at a temperature between about 120° and 170° C. at atmospheric pressure with about 4 to 8 parts of dinitrosopentamethylenetetramine per hundred parts of the polyvinylchloride resin in the presence of a slightly alkaline organic material from the class consisting of urea and tris-(hydroxymethyl) aminomethane and a weakly ionized acid from the class consisting of boric acid and citric acid, said slightly alkaline organic material being present in an amount of at least about one part by weight per part of dinitrosopentamethylenetetramine and said weakly ionized acid being present in an amount of from about 0.25 to about 2.0 parts by weight per part of dinitrosopentamethylenetetramine.

2. A process as in claim 1 wherein the slightly alkaline organic material is urea.

3. A process as in claim 1 wherein the weakly ionized acid is boric acid.

4. A process for the preparation of a substantially colorless, odor-free, open-cell polyvinylchloride sponge which comprises first forming a plastisol which includes a polyvinylchloride resin, a suitable plasticizer therefor, from about 0.04–0.08 part of dinitrosopentamethylenetetramine per part of the resin, and at least about one part of urea and from about 0.5 to about 2.0 parts of boric acid per part of dinitrosopentamethylenetetramine, and thereafter heating said plastisol at atmospheric pressure to a temperature in the range of about 120°–170° C. to decompose the dinitrosopentamethylenetetramine and foam the plastisol.

References Cited in the file of this patent

UNITED STATES PATENTS

| | | |
|---|---|---|
| 1,090,089 | Beckwith | May 16, 1933 |
| 1,912,591 | Olin | June 6, 1933 |
| 2,250,192 | Cuthbertson | July 22, 1941 |
| 2,444,881 | Sterrett | July 6, 1949 |
| 2,491,709 | Briggs et al. | Dec. 20, 1949 |
| 2,570,182 | Daly et al. | Oct. 9, 1951 |
| 2,666,036 | Schwenke | Jan. 12, 1954 |
| 2,754,276 | Walker et al. | July 10, 1956 |

OTHER REFERENCES

Du Pont Rubber Chemicals, February 1943, Report No. 43–1, page 41.

U. S. DEPARTMENT OF COMMERCE
PATENT OFFICE
CERTIFICATE OF CORRECTION

Patent No. 2,824,076                         February 18, 1958

Mack F. Fuller

It is hereby certified that error appears in the printed specification of the above numbered patent requiring correction and that the said Letters Patent should read as corrected below.

Column 3, line 55, for "odor" read -- order --; column 4, line 52, list of references cited, for "1,090,089" read -- 1,909,089 --.

Signed and sealed this 6th day of May 1958.

(SEAL)

Attest:
KARL H. AXLINE
Attesting Officer

ROBERT C. WATSON
Commissioner of Patents